United States Patent [19]

Yoshida

[11] Patent Number: 5,434,807
[45] Date of Patent: Jul. 18, 1995

[54] PARALLEL PSEUDO-RANDOM PATTERN GENERATING METHOD AND PSEUDO-RANDOM PATTERN GENERATOR USING THE SAME

[75] Inventor: Tomio Yoshida, Sendai, Japan

[73] Assignee: Advantest Corporation, Nerima, Japan

[21] Appl. No.: 221,561

[22] Filed: Apr. 1, 1994

[30] Foreign Application Priority Data

Apr. 2, 1993 [JP] Japan .................. 5-077008

[51] Int. Cl.6 .................. G06F 1/02
[52] U.S. Cl. .................. 364/717
[58] Field of Search .................. 364/717; 331/78; 377/33; 380/46

[56] References Cited

U.S. PATENT DOCUMENTS 5,268,949 12/1993 Watanabe et al. .................. 377/33
5,321,641 6/1994 Ohkubo .................. 364/717
5,327,365 7/1994 Fujisaki et al. .................. 364/717
5,331,581 7/1994 Ohkubo et al. .................. 364/717
5,351,300 9/1994 Quisquater et al. .................. 380/46

*Primary Examiner*—David H. Malzahn
*Attorney, Agent, or Firm*—Staas & Halsey

[57] ABSTRACT

A generating polynomial and a parallel bit number p are input via an input part 21. In an operating control part 22, a k-th power $A^k$ of a characteristic polynomial of a pseudo-random pattern is obtained, then a matrix $N^k$ with rows corresponding to p bits of the k-th power $A^k$ and (n−p) columns not corresponding to the p bits on the said rows is obtained, and then k is obtained for which the rank of the matrix $N^k$ is p. A parallel pattern of p bits from p shift stages of a pseudo-random pattern generator having n shift stages is selected and held by a select/hold part 26. A drive control part 24 drives the select/hold part 26 to output the p-bit parallel pattern each time the pseudo-random pattern generator performs a k-bit shift operation.

13 Claims, 3 Drawing Sheets

FIG. 1A PRIOR ART
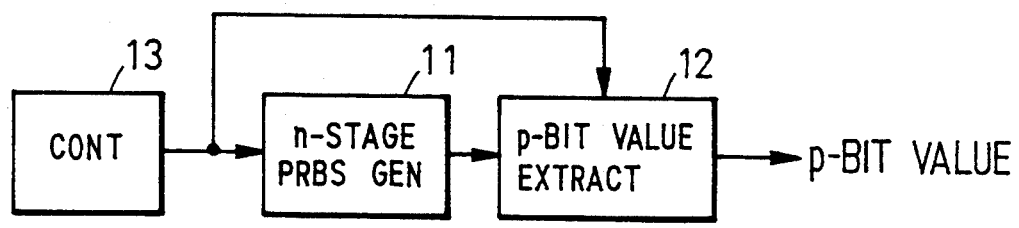
FIG. 1B
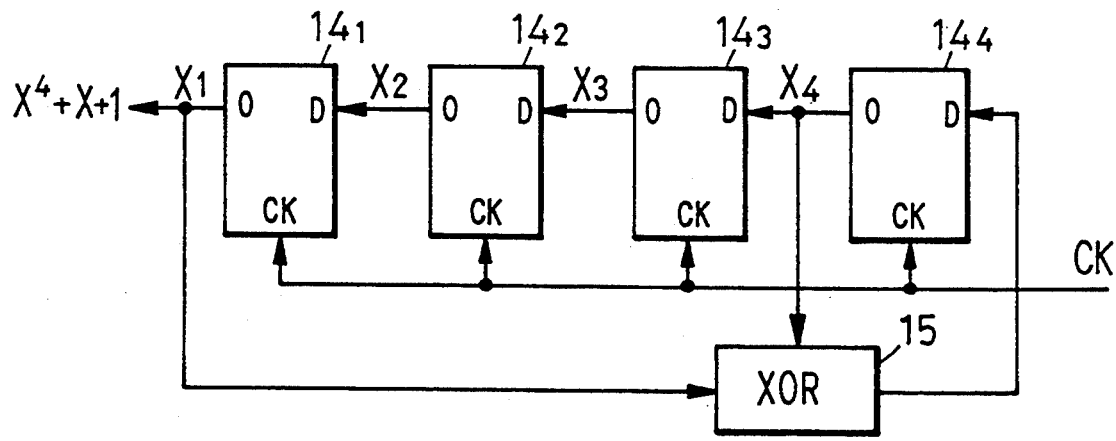
FIG. 1C
| t | $X_1$ | $X_2$ | $X_3$ | $X_4$ |
|---|---|---|---|---|
| 1 | 1 | 1 | 1 | 1 |
| 2 | 1 | 1 | 1 | 0 |
| 3 | 1 | 1 | 0 | 1 |
| 4 | 1 | 0 | 1 | 0 |
| 5 | 0 | 1 | 0 | 1 |
| 6 | 1 | 0 | 1 | 1 |
| 7 | 0 | 1 | 1 | 0 |
| 8 | 1 | 1 | 0 | 0 |
| 9 | 1 | 0 | 0 | 1 |
| 10 | 0 | 0 | 1 | 0 |
| 11 | 0 | 1 | 0 | 0 |
| 12 | 1 | 0 | 0 | 0 |
| 13 | 0 | 0 | 0 | 1 |
| 14 | 0 | 0 | 1 | 1 |
| 15 | 0 | 1 | 1 | 1 |

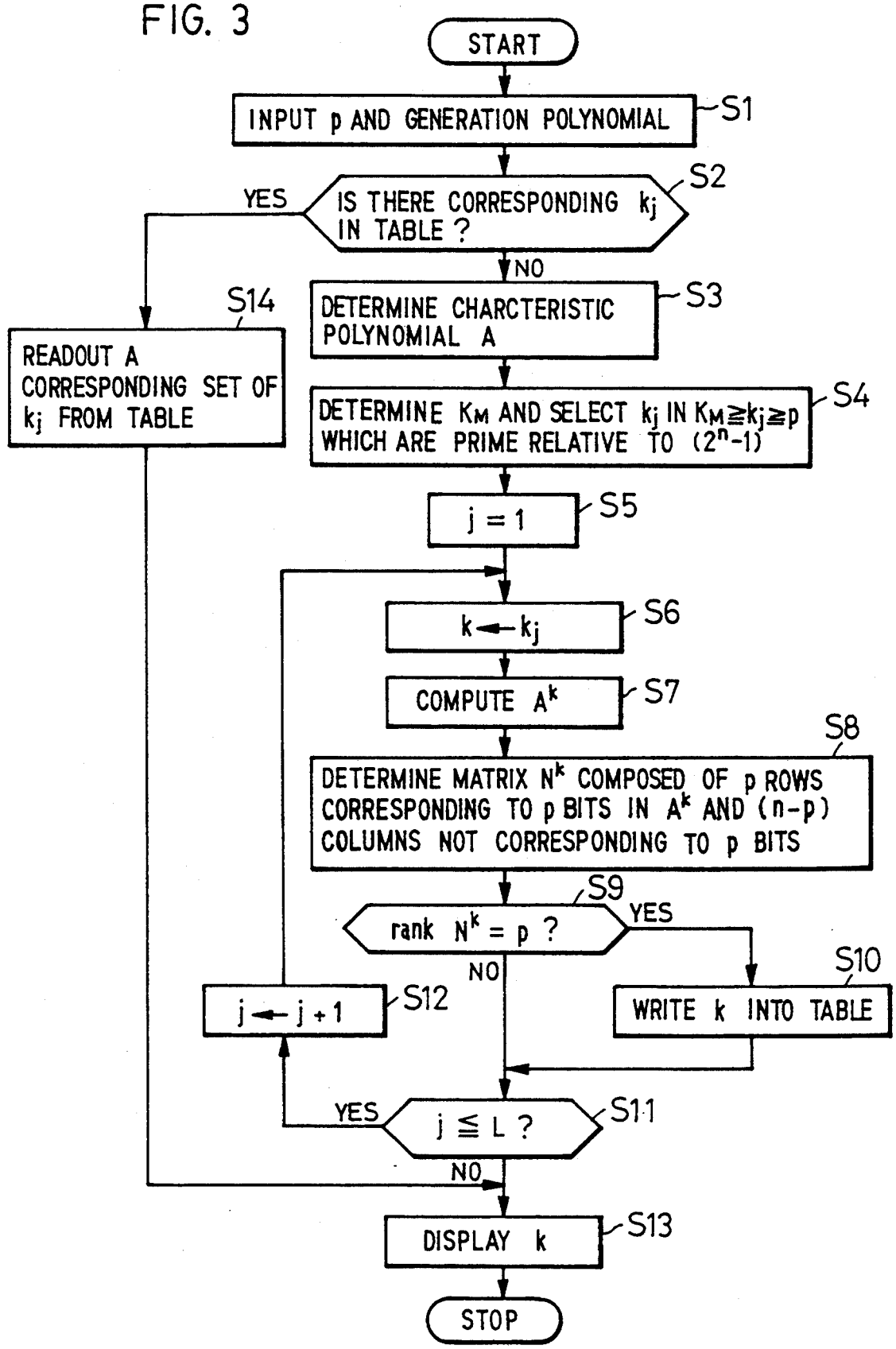

PARALLEL PSEUDO-RANDOM PATTERN GENERATING METHOD AND PSEUDO-RANDOM PATTERN GENERATOR USING THE SAME

BACKGROUND OF THE INVENTION

The present invention relates to a parallel pseudo-random pattern generating method which derives p-bit parallel patterns from a pseudo-random pattern generator formed by an n-stage shift register each time the pattern generator is shifted k bit positions. The invention also pertains to a pseudo-random pattern generating device using such a parallel pseudo-random pattern generating method.

A pseudo-random bit sequence (PRBS, referred to also as a pseudo-random pattern) is used in various technical fields. For instance, it is used as a transmission signal for measuring the error rate of a transmission line or for spectrum spreading a transmission signal. The situation may sometimes arise where a pseudo-random pattern composed of a plurality of parallel bits is needed, for instance, as a random address sequence which is used to randomly read out the contents of a ROM. In FIG. 1A there is shown a conventional parallel pseudo-random pattern generator. From p shift stages of a pseudo-random pattern generator (hereinafter referred to as an n-stage PRBS generator) 11 formed by an n-stage shift register are extracted parallel p bits by a p-bit extraction part 12 and, upon each extraction, the n-stage PRBS generator 11 is shifted k bit positions. That is, each time p bits are needed, the n-stage PRBS generator 11 is shifted k bit positions and the p bits are taken out; alternatively, the n-stage PRBS generator 11 is shifted at all times and each time it is shifted k bit positions, p bits are latched in the p-bit extraction part 12. In general, it is preferable that k be chosen to be equal to or greater than p in order to prevent the current p-bit pattern from containing a bit or bits of the previous p-bit pattern. To use the extracted p bits as an address sequence to read out a memory, for example, is equivalent to accessing to the memory with a random address. In this way, the n-stage PRBS generator 11 may sometimes by shifted k bit positions in synchronization with the period of using the p bits.

When it is required to provide a pseudo-random pattern which maximizes the pattern repetition period, the pseudo-random pattern generator is so formed as to generate a so-called M-sequence pattern. In such an instance, the repetition period of the M-sequence pattern is $2^n - 1$ bits. To make the values of the extracted p bit as random as possible, it is desirable that $2^n - 1$ and k be mutually prime. If they are not mutually prime, then the values of p bits which are taken out with a period shorter than the $2^n - 1$ bit period will be repeated, and hence the randomness of the p bit values will be impaired accordingly. For example, in the case where k is set to 3 and two bits "$x_3, x_4$" are output in FIG. 1C, the "$x_3, x_4$" bit outputs at t=1, 4, 7, 10 and 13 are "1, 1," "1, 0," "1, 0" and "0, 1," respectively; the occurrence rate of "1" is higher than that of "0" and outputs "0, 0" are not provided, instead the outputs "1, 0" are produced in succession.

As will be seen from the above, when the shift bit number k is not inappropriate, the transition of the values of p bits does not take place at random and is limited specifically to a set of fixed values. That is, it is desirable that p bits of the subsequent pattern be allowed to take $2^p$ kinds of values based on the current values of p bits, but this is not guaranteed when the number k is not appropriate. The M-sequence pattern available from the n-stage PRBS generator 11 takes all possible values (except all zeros) once every period—this is regarded as ensuring the randomness of the p bit values. Yet, when the p bit values cannot take $2^p$ kinds of values, the randomness is impaired.

For instance, consider a pseudo-random pattern generator using a four-stage shift register. As shown in FIG. 1B, four stages of D type flip-flops $14_4$ through $14_1$ are connected in series to form a shift register, which is driven by a clock CK that is fed to each of the flip-flops $14_4$ through $14_1$. The outputs from the last and first stages $14_1$ and $14_4$ are EXCLUSIVE ORed by an exclusive OR circuit 15, whose output is fed to the first stage $14_4$. The output from the last stage $14_1$ is provided as the M-sequence pseudo-random pattern. Letting the outputs from the shift stages $14_1$ through $14_4$ be represented by $x_1$ through $x_4$, the generating polynomial f(x) of this pseudo-random pattern is expressed by $f(x) = x^4 + x + 1$, and when initial values of $x_1$ through $x_4$ are all ones, the resulting bit sequences are such as shown in FIG. 1C.

In FIG. 1C, it is at time points t=1, 6, 14 and 15 that the outputs ($x_3, x_4$) go to (1, 1), and at t=2, 7, 15 and 1 after a one-bit shift of the register, the outputs ($x_3, x_4$) are (1, 0), (1, 0), (1, 1) and (1, 0), respectively. Hence, at a time point (t'=t+1) when the shift register is shifted one bit position after the outputs ($x_3, x_4$) go to (1, 1), there are only two kinds of values (1, 0) and (1, 1) which they are allowed to take. Similarly, when the shift register is shifted two bit positions (t'=t+2) after the outputs ($x_3, x_4$) go to (1, 1), there are four pairs of values (0, 1), (0, 0), (1, 1) and (1, 0) which the outputs ($x_3, x_4$) may take. Shifting the shift register two bit positions when the outputs ($x_3, x_4$) are (0, 1) or (1, 0), there are similarly four pairs of values that they can take. Shifting the shift register two bit positions when the outputs ($x_3, x_4$) are (0, 0), there are three pairs of values (1, 0), (0, 1) and (1, 1) that they may take—this is because the pseudo-random pattern does not take the value of all zeros.

It is desirable that the random number change from the current value to the next one with the same probability, whatever value it may take. In the case of the one-bit shift (k=1), however, one of the two bits always remains unchanged; hence, the randomness in this case is one-half of that in the case of the two-bit shift (k=2). To determine the most appropriate number k of bits to be shifted, it is customary in the prior art to check the number of values that the p-bit output is allowed to take for each number k as described above in respect of FIG. 1C and select the number k of bits that provides many values for the p-bit output. On this account, the conventional method becomes harder with an increase in the number n of shift stages.

SUMMARY OF THE INVENTION

It is therefore an object of the present invention to provide a parallel pseudo-random pattern generating method which allows ease in determining the number of bits to be shifted that generates a parallel pseudo-random pattern of excellent randomness even if the shift register used has many shift stages.

Another object of the present invention is to provide a parallel pseudo-random pattern generator utilizing the above-said parallel pseudo-random pattern generating method.

According to the present invention, a k power $A^k$ of a characteristic polynomial A of the pseudo-random pattern by the pseudo-random pattern generator is used to obtain a matrix $N^k$ with p rows corresponding to the p bits to be taken out and (n−p) columns not lo corresponding to the p bits on the p rows. When p is an integer that satisfies $2 \leq p \leq n/2$, k is chosen so that the rank of the matrix $N^k$ becomes p, and the pseudo-random pattern generator outputs a pattern of p bits available from its p shift stages each time it is shifted k bit positions.

When p is an integer that satisfies $p = n/2$, k is chosen such that the value of the determinant of the matrix $N^k$ does not become zero, and when p is an integer that satisfies $n > p > n/2$, k is chosen such that the rank of the matrix $N^k$ becomes (n−p).

BRIEF DESCRIPTION OF THE DRAWINGS

FIG. 1A is a block diagram showing a conventional parallel pseudo-random pattern generator;

FIG. 1B is a block diagram showing a concrete example of a pattern generator 11 in FIG. 1A;

FIG. 1C is a table showing variations of patterns that are generated by the pattern generator of FIG. 1B;

FIG. 3 is a flowchart showing the process for obtaining the number k of bits for shift.

DESCRIPTION OF THE PREFERRED EMBODIMENT

Figure 2:
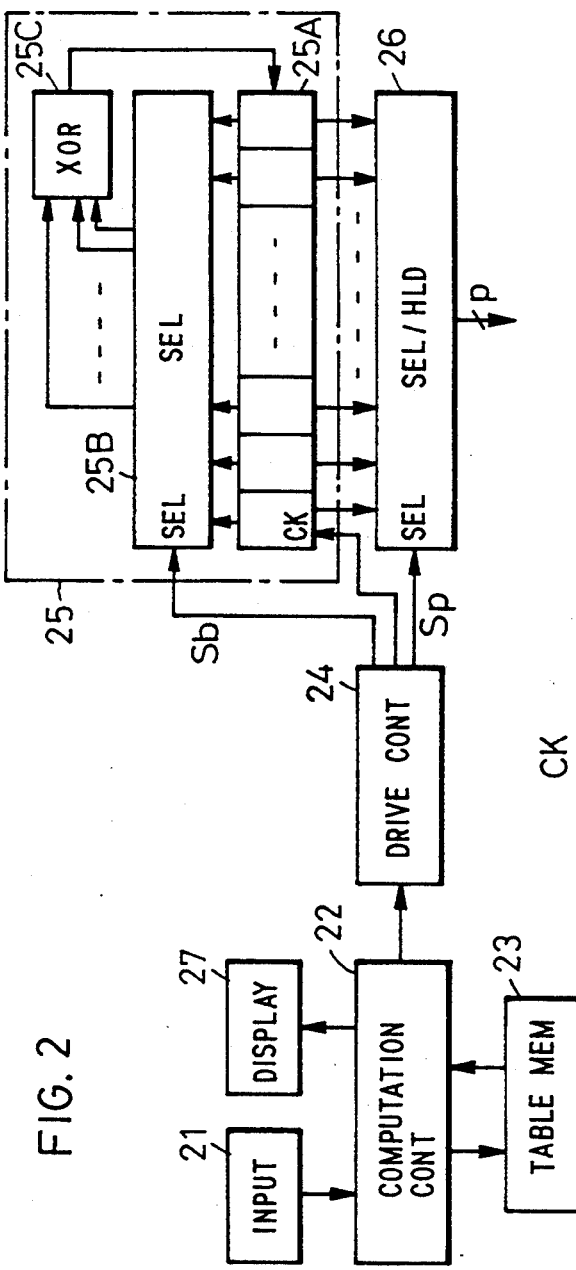
FIG. 2 is a block diagram illustrating an embodiment of the present invention.
Figure 4:
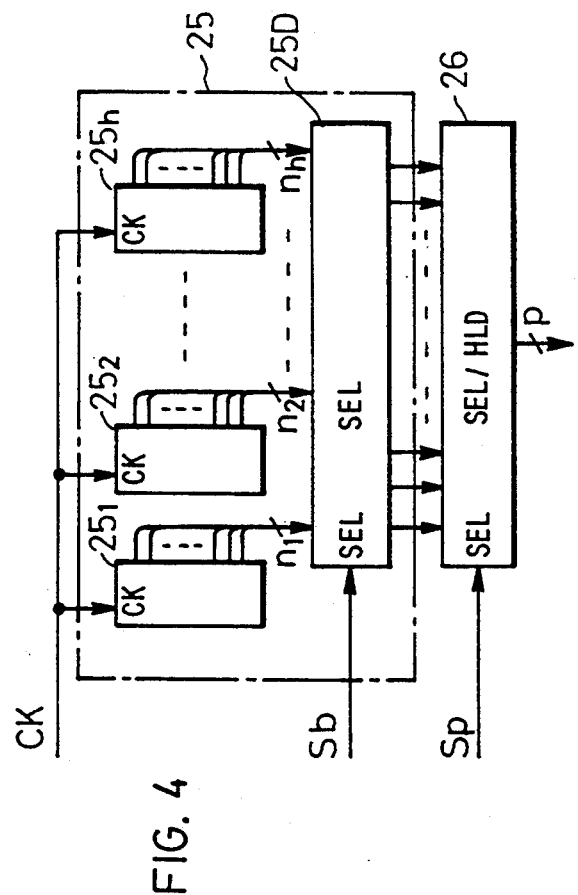
FIG. 4 is a block diagram illustrating another embodiment of a pattern generator 25.

A description will be given first of the principles of the present invention. In the case of the generating polynomial, $f(x) = x^4 + x + 1$, of the four-bit pseudo-random pattern shown in FIGS. 1B and 1C, the output $x_i$ from each stage $14_i$ (where i=1, 2, 3, 4) upon each shift of one bit is given by the following equation, as will be seen from FIG. 1C, $$x_1(t+1) = x_2(t)$$

$$x_2(t+1) = x_3(t)$$

$$x_3(t+1) = x_4(t)$$

$$x_1(t+1) = x_2(t)$$

$$x_4(t+1) = x_1(t) + x_4(t) \quad (1)$$

This can be expressed in the following matrix form.

$$\begin{bmatrix} 0100 \\ 0010 \\ 0001 \\ 1001 \end{bmatrix} \begin{bmatrix} x_1(t) \\ x_2(t) \\ x_3(t) \\ x_4(t) \end{bmatrix} = \begin{bmatrix} x_1(t+1) \\ x_2(t+1) \\ x_3(t+1) \\ x_4(t+1) \end{bmatrix} \quad (2)$$

The leftmost matrix uses the right-hand sides of Eq. (1) as elements and will hereinafter be called a characteristic polynomial of the pseudo-random pattern whose generating polynomial is expressed by $f(x) = 4^4 + x + 1$, and the characteristic polynomial is denoted as A. For example, if the generating polynomial f(x) of fourth order is generally expressed by the following equation $$f(x) = a_4 x^4 + a_3 x^3 + a_2 x^2 + a_1 + 1,$$

the characteristic polynomial A of the pseudo-random pattern can be expressed by the following matrix with rows and columns corresponding to the terms of respective orders in the generating polynomial f (x).

$$\begin{array}{c} \phantom{x^4} \begin{array}{cccc} x^4 & x^3 & x^2 & x \end{array} \\ \begin{array}{c} x^4 \\ x^3 \\ x^2 \\ x \end{array} \begin{bmatrix} 0 & 1 & 0 & 0 \\ 0 & 0 & 1 & 0 \\ 0 & 0 & 0 & 1 \\ a_4 & a_3 & a_2 & a_1 \end{bmatrix} \end{array}$$

In general, also for the generating polynomial of arbitrary order, tile corresponding characteristic polynomial A can similarly be expressed.

Now, letting the column vector next to the matrix A and the column vector of the right-hand side of Eq. (2) be represented by x(t) and x(t+1), respectively, that is, if Eq. (2) is expressed by $$Ax(t) = x(t+1) \quad (3)$$

the value after a two-bit shift is given by $$x(t+2) = Ax(t+1) = AAx(t) = A^2 x(t) \quad (4)$$

Thus, the value after a k-bit shift can be expressed by the following equation.

$$A^k x(t) = x(t+k) \quad (5)$$

This $A^k$ will hereinafter be referred to as a characteristic polynomial of the four-bit pseudo-random pattern of the generating polynomial $f(x) = x^4 + x + 1$ which is provided after the k-bit shift. It is desirable that k and $2^4 - 1 = 5$ be mutually prime; as referred to previously, it is desirable in an n-stage pseudo-random pattern generator that k and $2^n - 1$ be mutually prime.

In the case of the pseudo-random pattern generator depicted in FIG. 1B, as will be seen from FIG. 1C, the pattern sequence when $k \geq 8$ is the inverse of the sequence of the pseudo-random pattern which is provided upon each shift of k' bits (where k' = 15 − 1). For example, in FIG. 1C, the sequence of the output bits ($x_3$, $x_4$), which is provided when the shift register is repeatedly shifted 11 bit positions (k = 11) in the case where the outputs $x_3$ and $x_4$ are (1, 1) at t = 1, are (00), (10), (11), (00), (10), (01), (11), (10), (11), (10), (01), (01), (01), and thereafter this sequence is repeated. The sequence of the output bits ($x_3$, $x_4$) in the case of repeating a shift of four bits (k' = 4) starting at t = 1 is a merely inverted version of the sequence obtained in the case of k = 11. The reason for this is that when setting k' = 15 − k, $x_i(t+k') = x_i(t+15-k) = x_i(t-k)$ for i = 1 to 4 since one cycle is 15-bit long. Generally, in the case of an n-stage random pattern generator, when k and k' are symmetrical about $(2^n - 1)/2$, the sequence of the pesudo-random pattern by the k-bit shift is opposite to the sequence of the pseudo-random pattern by the k'-bit shift.

Letting each component of the characteristic polynomial $A^k$ after the k-bit shift, expressed by Eq. (5), be represented by $a_{ij}$ (i being the row number and j the column number), the respective output bits $x_i$ can be expressed by the following equations.

$$x_1(t+k) = a_{11} x_1(t) + a_{12} x_2(t) + a_{13} x_3(t) + a_{14} x_4(t) \quad (6\text{-}1)$$

$$x_2(t+k) = a_{21} x_1(t) + a_{22} x_2(t) + a_{23} x_3(t) + a_{24} x_4(t) \quad (6\text{-}2)$$

$$x_3(t+k) = a_{31}x_1(t) + a_{32}x_2(t) + a_{33}x_3(t) + a_{34}x_4(t) \quad (6\text{-}3)$$

$$x_4(t+k) = a_{41}x_1(t) + a_{42}x_2(t) + a_{43}x_3(t) + a_{44}x_4(t) \quad (6\text{-}4)$$

In the above example, the low-order two bits $x_3$ and $x_4$ are taken out, and hence it is necessary only to check what values the bits $x_3$ and $x_4$ will take, that is, what values Eqs. (6-3) and (6-4) will assume. In the event that no "1" exists in the columns corresponding to the high-order two bits $x_1$ and $x_2$, that is, when $a_{31}$, $a_{32}$, $a_{41}$, $a_{42}$ are all zeros, $$x_3(t+k) = a_{33}x_3(t) + a_{34}x_4(t) \quad (7\text{-}1)$$

$$x_4(t+k) = a_{43}x_3(t) + a_{44}x_4(t) \quad (7\text{-}2)$$

Thus, $x_3(t+k)$ and $x_4(t+k)$ depend only on the current two bits $x_3(t)$ and $x_4(t)$, respectively, and the randomness of the forthcoming pattern will be impaired, then the selection like this needs to be avoided. To provide as many values as possible for the bit $x_3(t+k)$ (with the same probability of occurrence), at least one of $a_{31}$ and $a_{32}$ corresponding to the high-order bits needs to be a "1." Similarly, to provide values of the same probability of occurrence for the bit $x_4(t+k)$, at least one of $a_{41}$ and $a_{42}$ needs to be a "1."

Furthermore, since it is necessary that the bits $x_3(t+k)$ and $x_4(t+k)$ take random values independently of each other, Eqs. (6-3) and (6-4) have nothing to do with each other. Besides, since it is required that the bits $x_3(t+k)$ and $x_4(t+k)$ generated by the k-bit shift as mentioned previously do not depend only on the preceding two bits $x_3(t)$ and $x_4(t)$, it is necessary that Eqs. (6-3) and (6-4) do not depend on $a_{33}$, $a_{34}$ and $a_{43}$, $a_{44}$ but are independent of each other. In general, when the rank of an n by m matrix is r, r rows are linearly independent. Thus, the above-mentioned condition that Eqs. (6-3) and (6-4) be independent of each other means that the following submatrix with rows corresponding to the take-out bits $x_3$ and $x_3$ of the characteristic polynomial $A^k$ and columns not corresponding to the bits $x_3$ and $x_4$ has a rank of 2.

$$N^k = \begin{bmatrix} a_{31}, & a_{32} \\ a_{41}, & a_{42} \end{bmatrix} \quad (8)$$

In general, in the case of a n by n square matrix, that its rank is n is equivalent to that the value of the determinant of this matrix is not zero. Hence, when the submatrix $N^k$ is a square matrix as mentioned above, the value of Eq. (8), i.e. the value of the determinant of the submatrix $N^k$ needs not only to be zero.

To sum up, in the case of taking out arbitrary bits from an n-stage pseudo-random pattern generator, if the rank of a p by (n−p) matrix (=$N^k$) with rows corresponding to the p bits in the matrix $A^k$ and (n−p) columns not corresponding to the p bits is p, or when the matrix $N^k$ is a p by p square matrix, if the value of its determinant is not zero, $2^p$ kinds of values could be obtained by taking out p bits upon each k-bit shift of the shift register and excellent randomness could be obtained. That is, the number k which satisfies the aforementioned condition is an optimum value.

FIG. 2 illustrates in block form an embodiment of the parallel pseudo-random pattern generator according to the present invention. This embodiment comprises: an input part 21 for inputting a generating polynomial and a value of selection bits, p, which are needed to generate the required pseudo-random pattern (PRBS); a table memory 23 for storing the shift bit number k obtained by computation; an operation control part 22 which computes the optimum value of the shift bit number k from the input generating polynomial and shift bit number k, writes the computed value of the number k into the table memory 23 and reads it out therefrom; a display 27 for displaying the value of the number k obtained by computation or read out from the table memory 23; a PRBS generator 25 provided with has n shift stages corresponding to the set generating polynomial, for generating a pseudo-random pattern PRBS; a selector 26 for selecting specified p bits from the output of the PRBS generator 25 and for outputting them; and a drive control part 24 which controls the operation of the PRBS generator 25 in accordance with the specified generating polynomial and specifies the bits to be selected by the selector 26.

In this embodiment, in order to allow it to generate desired M sequences with the number n of shift stages specified by the generating polynomial, the PRBS generator 25 is made up of: a shift register 25A which has at least as many stages as the maximum number n of shift stages predicted to use; a selector 25B which selects the outputs from desired shift stages of the shift register 25A in accordance with the generating polynomial; and an exclusive OR circuit 25C which EXCLUSIVE ORs the plurality of outputs selected by the selector 25B and feeds the exclusive OR back to the input of the shift register 25A. The shift operation of the shift register 25A takes place in synchronization with a clock signal CK from the drive control part 24. When the M-sequence to be generated is determined by the specified generating polynomial, the drive control part 24 reads out from a memory (not shown) desired initial values (which are not all zeros) for n shift stages suitable for the generation of the M-sequence and sets them in n shift stages of the shift register 25A. Upon each application of a select control signal Sp from the drive control part 24, the select/hold part 26 selects the p bits specified by the signal Sp from the shift stage outputs of the shift register 25A and holds and outputs them. The drive control part 24 outputs the select control signal Sp every specified k clocks.

FIG. 3 is a flowchart showing the process for determining the shift bit number k by the operation control part 22. When a generating polynomial for a desired kind (M-sequence, for example) of pseudo-random pattern (PRBS) to be generated and the number p of parallel bits to be selectively output are input from the input part 21 (step S1), a check is made to see if the shift bit number k corresponding to the bit number p and the generating polynomial has already been computed and stored in the table memory 23 (step S2). If the bit number k has not been stored in the table memory 23, then the operation control part 22 derives the characteristic polynomial A from the generating polynomial (step S3). Generating polynomials and characteristic polynomials have a one-to-one correspondence, and the determination of a generating polynomial and the determination of a characteristic polynomial A are equivalent to each other. Hence, in step S1 the characteristic polynomial A may be input in place of the generating polynomial. In the case where the PRBS generator 25 is formed by an n-stage shift register, the exclusive OR between the last stage output and at least one intermediate stage output needs to be fed back to the input of the shift register to obtain a desired pseudo-random pattern; it is well-known in the art which intermediate stage output should be EXCLUSIVE ORed with the last stage output in accordance with the pseudo-random pattern desired to generate. Furthermore, where the PRBS generator for generating the M-sequence pattern is formed by the n-stage shift register, the number of generating polynomials involved is not always limited to one but two or more generating polynomials may sometimes be involved.

In step S4 the operation control part 22 determines, for example, the maximum integer smaller than $(2^n-1)/2$ as the maximum value $K_M$ of the range within which to select the shift bit number k and calculates the value $k_j (j=1, 2, \ldots, L)$ of every number k which is prime to $(2^n-1)$ in the range of $p \leq k \leq K_M$. Here, L is an integer equal to or greater than 1. The number n of shift stages can be obtained as the maximum order or degree of the input generating polynomial. The maximum value $K_M$ need not always be determined in such a manner as mentioned above but may also be selected freely on the basis of actual conditions.

In step S5 j is initialized to 1 and then in step S6 k is set to $k_j$. Next, the characteristic polynomial A obtained from the afore-mentioned generating polynomial is raised to the k-th power to obtain a characteristic polynomial $A^k$ after k-bit shift (step S7). This is followed by step S8, in which a p by (n−p) submatrix $N^k$ is obtained in the same manner as described previously.

In step S9 the rank r of the submatrix $N^k$ is calculated and a check is made to see if the value r is equal to the number p of parallel bits to be generated. If they are equal, flow proceeds to step S10 wherein the value ($k_1$) of the k at that time is stored in an area corresponding to the number p on a table of the table memory 23 corresponding to the input generating polynomial. If the rank r is not equal to the number p, then it is determined in step S11 if the check in step S9 has been completed for all j's; if not, then j is incremented by one and flow goes back to step S6. In consequence, the same processing as mentioned above is repeated for j=2, that is, for $k_2$ in steps S6 through S11.

When it is determined in step S11 that the processing has been done for all k's, flow proceeds to step S13 wherein all the values $k_j$ stored in the table memory 23 corresponding to the value p are read out and displayed on the display 27.

When it is determined in step S2 that a set of values $k_j$ with the same value of select bits p and generating polynomial has already been calculated and stored in the table memory 23, flow proceeds to step S14 wherein the values $k_j$ are read out as the set of values $k_j$ and displayed on the display 27.

An operator selects a desired one of the thus displayed values $k_j$ and specifies it through the input part 21. The operation control part 22 provides the specified value $k_j$, as the value of the shift bit number k, to the drive control part 24. As $k_j$ is selected a value for which an integral multiple of a k-bit shift period Tk (k clock periods), for instance, is nearly equal to the pattern usage repetition period of an external device which calls for the parallel p-bit random pattern.

Where p=n−p, the submatrix $N^k$ obtained in step S8 of FIG. 3 is a p by p square matrix. In this instance, it is possible to make a check in step S9 to see if the value det $N^k$ of the determinant of the matrix $N^k$ is not zero, instead of making a check to see if the rank of the matrix $N^k$ is p; and if it is not zero, then the value $k_j$ at that time is written into the table memory 23 in step S10.

In either case, the shift bit numbers k for which the rank of the submatrix $N^k$ becomes equal to the bit number p or for which the value of the determinant of the submatrix $N^k$ does not become zero are precalculated by the operation control part 22 for various generating polynomials and p's, and they are prestored in the table memory 23. Then, in accordance with the input generating polynomial and p, the corresponding set of values $k_j$ are read out from the table memory 23 and displayed on the display 27.

When specifying an appropriate value $k_j$ through the input part 21 as mentioned above, it is supplied from the operation control part 22 to the drive control part 24, while at the same time the generating polynomial and the number p input through the input part 21 are also fed from the operation control part 22 to the drive control part 24. The drive control part 24 supplies the selector 25B with a selection set signal Sb which selects a plurality of predetermined shift stages of the selector 25B in accordance with the specified generating polynomial, thereby setting the number n of shift stages of the PRBS generator 25 and one or more intermediate stages whose outputs are to be EXCLUSIVE ORed with the last stage output. Moreover, the drive control part 24 sets the select/hold part 26 by a select/hold signal Sp so that, upon each generation of k clock pulses CK (that is, upon each k-bit shift of the shift register 25A), the PRBS generator 25 generates a p-bit parallel pattern from its desired shift stages. Alternatively, the clock signal CK may be fed to the shift register 25A of the PRBS generator 25 so that it is shifted k bit positions each time it outputs p bits. The p bit could easily be taken out through the select/hold part 26 by presetting it to select the p bits, starting at the most significant or least significant bit position, for example. Alternatively, the PRBS generator 25 in FIG. 2 is substituted with a plurality of PRBS generators $25_1, 25_2, 25_n$ which have different numbers of shift stages $n_1, n_2, \ldots, n_h$, respectively, and generate predetermined different M-sequence pseudo-random patterns; one of their parallel outputs is selected by a selector 25D and, at the same time, p bits are selected and held by the select/hold part 26 under control of the control signal Sp every k clocks in accordance with the corresponding value of k read out of the table memory 23.

While in the above the operator has been described to select: one value k from the set of values k displayed on the display 27, it is also possible to automatically select the minimum or maximum value of k within such a range as determined in step S4 of FIG. 3. It is also possible to fix the number n of shift stages of the PRBS generator 25, use a predetermined generating polynomial and specify the value p alone; alternatively, it is possible to specify the number n of shift stages, fix the value p and use the select/hold part 26 merely as a latch for the p bits. The value p is not limited specifically to $p \leq n/2$ but may be set to $p > n/2$, in which case, by obtaining an appropriate value k for which the rank of the submatrix $N^k$ is the maximum value (n−p), the maximum randomness for the generated pseudo-random pattern is guaranteed.

As described above, according to the present invention, an appropriate value k is automatically provided very easily in a short time without involving the conventional process of checking how the pseudo-random pattern would change for each value k to determine if the value k is appropriate. Even if the number n of shift stages is large, the optimum value k can easily be obtained through manual or automatic selection.

It will be apparent that many modifications and variations may be effected without departing from the scope of the novel concepts of the present invention.

What is claimed is:

1. A parallel pseudo-random pattern generator comprising:
   pseudo-random pattern generating means which generates a desired pseudo-random pattern in accordance with a specified characteristic polynomial A, said pseudo-random pattern generating means being set to form n shift stages corresponding to said specified characteristic polynomial;
   selector means which selects desired p shift stages of said pseudo-random pattern generating means and outputs a parallel pattern of p bits provided from said selected p shift stages, p being an integer satisfying a condition that $2 \leq p \leq n/2$;
   calculating means which calculates, from a k-th power $A^k$ of said characteristic polynomial A of said pseudo-random pattern by said pseudo-random pattern generating means, said k which provides a value p as the rank of a matrix $N^k$ with p rows corresponding to said p bits and (n−p) columns not corresponding to said p bits on said p rows; and
   drive means which drives said selector means to output said p-bit parallel pattern upon each k-bit shift of said pseudo-random pattern generating means.

2. The parallel pseudo-random pattern generator of claim 1, wherein said pseudo-random pattern generating means comprises: a shift register with the maximum number of shift stages predicted to use; shift stage select means which selects the output of the shift stage n-th from the input side of said shift register and the output of at least one of the shift stages intermediate between said selected n-th shift stage and said input side of said shift register; and exclusive OR means which EXCLUSIVE ORs the outputs of said shift stages selected by said shift stage select means and feeds back the exclusive OR to the input of said shift register.

3. The parallel pseudo-random pattern generator of claim 1, wherein said pseudo-random pattern generating means comprises: a plurality of pseudo-random pattern generators, each formed by a shift register of a different number of shift stages and generating a predetermined different pseudo-random pattern; and selector means which is supplied with outputs from pluralities of shift stages of said plurality of pseudo-random pattern generators and outputs the outputs from said plurality of shift stages of a selected one of said plurality of pseudo-random pattern generators.

4. The parallel pseudo-random pattern generator of claim 1, which further comprises table memory means for storing a shift bit number k obtained by said calculating means in correspondence with said generating polynomial and said select bit number p, and wherein when the shift bit number k corresponding to said generating polynomial and said select bit number p has already been stored in said table memory means, said calculating means provides to said drive means one of the corresponding shift bit numbers k read out of said table memory means.

5. A parallel pseudo-random pattern generator comprising:
   pseudo-random pattern generating means which generates a desired pseudo-random pattern in accordance with a specified characteristic polynomial A, said pseudo-random pattern generating means being set to form n shift stages corresponding to said specified characteristic polynomial;
   selector means which selects desired p shift stages of said pseudo-random pattern generating means and outputs a parallel pattern of p bits provided from said selected p shift stages, p being an integer satisfying a condition that $p = n/2$;
   calculating means which calculates, from a k-th power $A^k$ of said characteristic polynomial A of said pseudo-random pattern by said pseudo-random pattern generating means, said k which makes zero the value of the determinant of a matrix $N^k$ with p rows corresponding to said p bits and (n−p)=p columns not corresponding to said p bits on said p rows; and
   drive means which drives said selector means to output said p-bit parallel pattern upon each k-bit shift of said pseudo-random pattern generating means.

6. A parallel pseudo-random pattern generator comprising:
   pseudo-random pattern generating means which generates a desired pseudo-random pattern in accordance with a specified characteristic polynomial A, said pseudo-random pattern generating means being set to form n shift stages corresponding to said specified characteristic polynomial;
   selector means which selects desired p shift stages of said pseudo-random pattern generating means and outputs a parallel pattern of p bits provided from said selected p shift stages, p being an integer satisfying a condition that $n > p > n/2$;
   calculating means which calculates, from a k-th power $A^k$ of said characteristic polynomial A of said pseudo-random pattern by said pseudo-random pattern generating means, said k which provides a value (n−p) as the rank of a matrix $N^k$ with p rows corresponding to said p bits and (n−p) columns not corresponding to said p bits on said p rows; and
   drive means which drives said selector means to output said p-bit parallel pattern upon each k-bit shift of said pseudo-random pattern generating means.

7. A parallel pseudo-random pattern generating method which generates a pseudo-random pattern by pseudo-random pattern generating means formed by a shift register having n shift stages and shifts said shift register k bit positions each time parallel p bits selected from said n shift stages are output as a parallel pseudo-random pattern, said method comprising the steps of:
   A. obtaining a matrix $A^k$ by raising to a k-th power a characteristic polynomial A corresponding to a pseudo-random pattern to be generated by said pseudo-random pattern generating means;
   B. obtaining a matrix $N^k$ with p rows corresponding to said p bits and (n−p) columns not corresponding to said p bits on said p rows, p being an integer which satisfies a condition $2 \leq p \leq n/2$; and
   C. selecting, as shift bit number k, k for which the rank of said matrix $N^k$ is equal to said p.

8. The method of claim 7, which further comprises a step wherein, for a preselected value k within a predetermined range, a plurality of values k are repeatedly determined in said steps A, B and C.

9. The method of claim 8, which further comprises a step of selecting said k within said predetermined range as a value which is prime to $(2^n-1)$.

10. The method of claim 8, which further comprises a step of storing said plurality of values k in a table memory in correspondence to said generating polynomial and said value p.

11. The method of claim 10, wherein a check is made to see if the value k corresponding to a specified generating polynomial and said p bits has already been stored in said table memory and, if not, said steps A, B and C and said k storing step are performed, and if said k has already been stored in said table memory, said k is read out therefrom to use.

12. A parallel pseudo-random pattern generating method which generates a pseudo-random by pseudo-random pattern generating means formed by a shift register having n shift stages and shifts said shift register k bit positions each time parallel p bits selected from said n shift stages are output as a parallel pseudo-random pattern, said method comprising the steps of:

A. obtaining a matrix $A^k$ by raising to a k-th power a characteristic polynomial A corresponding to a pseudo-random pattern to be generated by said pseudo-random pattern generating means;

B. obtaining a matrix $N^k$ with p rows corresponding to said p bits and $(n-p)=p$ columns not corresponding to said p bits on said p rows, p being an integer which satisfies a condition $p=n/2$; and C. selecting, as said shift bit number k, k for which the determinant of said matrix $N^k$ is zero.

13. A parallel pseudo-random pattern generating method which generates a pseudo-random pattern by pseudo-random pattern generating means formed by a shift register having n shift stages and shifts said shift register k bit positions each time parallel p bits selected from said n shift stages are output as a parallel pseudo-random pattern, said method comprising the steps of:

A. obtaining a matrix $A^k$ by raising to a k-th power a characteristic polynomial A corresponding to a pseudo-random pattern to be generated by said pseudo-random pattern generating means;

B. obtaining a matrix $N^k$ with p rows corresponding to said p bits and $(n-p)$ columns not corresponding to said p bits on said p rows, p being an integer which satisfies a condition $n>p>n/2$; and C. selecting, as said shift bit number k, k for which the rank of said matrix $N^k$ is equal to $(n-p)$.

* * * * *

UNITED STATES PATENT AND TRADEMARK OFFICE
CERTIFICATE OF CORRECTION

PATENT NO. : 5,434,807
DATED : July 18, 1995
INVENTOR(S) : Tomio YOSHIDA

It is certified that error appears in the above-indentified patent and that said Letters Patent is hereby corrected as shown below:

TITLE PAGE [73], change "Nerima" to --Tokyo--.

Column 3, line 5, delete "lo".

Column 4, line 1, change "$a_1$" to --$a_1 x$--.

Column 8, line 40, after "$25_2$" insert --...,--.

Column 8, line 50, delete ":".

Signed and Sealed this

Twenty-fourth Day of October, 1995

Attest:

Attesting Officer

BRUCE LEHMAN

Commissioner of Patents and Trademarks